May 12, 1925.
L. R. BUCKENDALE
CROSS TUBE FOR STEERING GEARS
Filed March 7, 1924
1,537,330
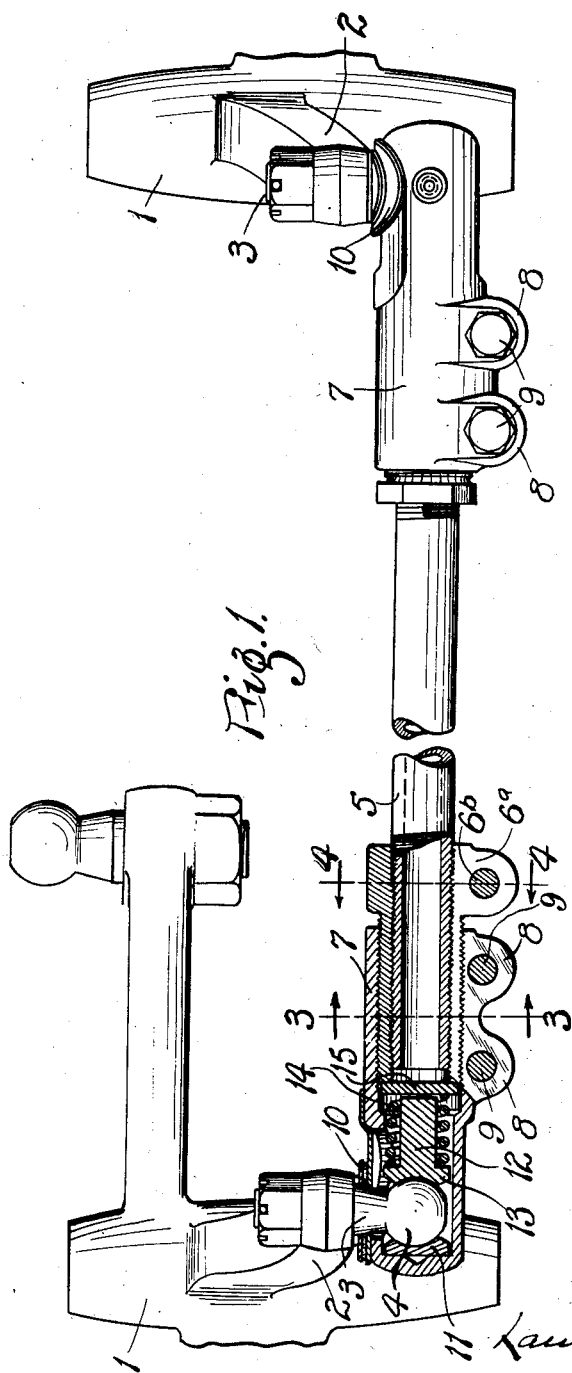
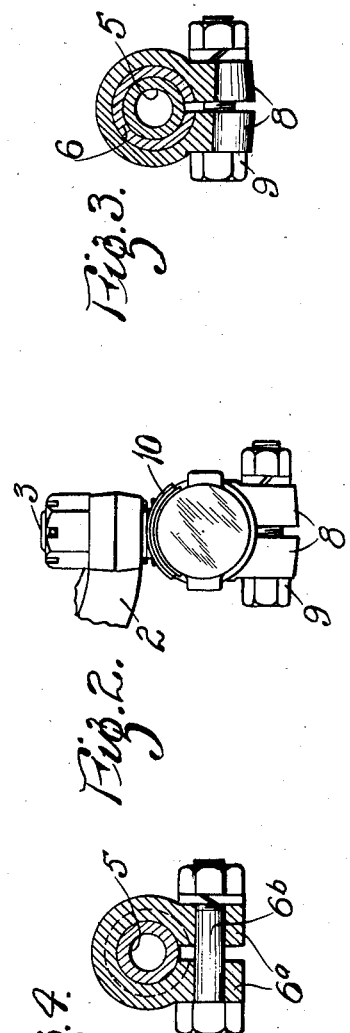
INVENTOR:
Laurence Ray Buckendale,
His ATTORNEYS Patented May 12, 1925.

1,537,330

UNITED STATES PATENT OFFICE.

LAURENCE RAY BUCKENDALE, OF DETROIT, MICHIGAN, ASSIGNOR TO THE TIMKEN-DETROIT AXLE COMPANY, OF DETROIT, MICHIGAN, A CORPORATION OF OHIO.

CROSS TUBE FOR STEERING GEARS.

Application filed March 7, 1924. Serial No. 697,682.

*To all whom it may concern:*

Be it known that I, LAURENCE RAY BUCKENDALE, a citizen of the United States, and a resident of the city of Detroit, in the county of Wayne and State of Michigan, have invented a new and useful Improvement in Cross Tubes for Steering Gears, of which the following is a specification.

My invention relates to cross tube for steering gear and has for its principal objects a steering gear cross tube in which the center distances can be easily adjusted and in which the distance from the center of the ball of the steering knuckle arm to the end of the cross tube is reduced to a minimum, so as to avoid interference between the cross tube and the wheel when tires of large section are used.

The invention consists principally in providing a tubular mounting member or end fitting for the ball of the steering knuckle arm at each end of the cross tube and interposing a threaded bushing between said tubular member and the cross tube. The invention further consists in the parts and combinations of parts hereinafter described and claimed.

In the accompanying drawing,

Fig. 1 is a section of a cross tube for steering gear embodying my invention, one end portion thereof being shown in longitudinal section, Fig. 2 is an end view thereof, Fig. 3 is a cross sectional view on the line 3—3 of Fig. 1, and Fig. 4 is a cross sectional view on the line 4—4 of Fig. 1.

The steering knuckles 1 of an automobile are commonly provided with projecting arms 2, each of which has a stem 3 at the end that is provided with a ball or rounded knob 4, said balls being disposed in the ends of the cross tube 5, whereby the two steering knuckles are operatively connected.

According to my invention, the cross tube 5 proper is threaded at each end to receive a split tubular sleeve or bushing 6 that is threaded interiorly and exteriorly. Threaded onto each sleeve 6 is a tubular end fitting 7 that is split endwise. The sleeve 6 may be provided with lugs 6ᵃ at the end through which extends a bolt 6ᵇ. The end fitting 7 is provided with lugs 8 on either side of the split therein, through which extend bolts 9, whereby the fitting may be clamped onto the split sleeve 6, the split sleeve being thereby clamped to the cross tube 5.

Each end fitting 7 is provided with an opening in the top to permit the stem 3 and ball 4 of the steering knuckle arm to extend into the same. The opening is closed by a suitable plate 10 that is perforated to accommodate the stem 3.

Seated in the closed end of each end fitting is a disk or seat 11 that is provided with a suitable concave depression for the ball 4 of the steering knuckle arm 2. A plunger 12 mounted in the bore of each fitting 7 is provided with an enlarged head 13 that is also provided with a concave depression adapted to accommodate the steering knuckle ball 4. Thus, each ball 4 is held on one side by one of the disks 11 and on the other by one of the plungers 12. A spring 14 is mounted on each plunger 12 and bears against a suitable disk or washer 15 that is mounted in the bore of each end fitting 7 against the end of the sleeve 6.

In order to adjust the center distances or to adjust for wear or the like, it is only necessary to loosen the bolts that clamp the end fittings and sleeves onto the cross tube, and then manipulate the threaded sleeves until the desired adjustment is obtained.

The above described cross tube construction is simple and it is very easily assembled and adjusted. It reduces to a minimum the distances between the steering knuckle balls and the ends of the cross tube, thus preventing interference between the cross tube and the tires of the automobile.

Obviously numerous changes may be made without departing from the invention and I do not wish to be limited to the precise construction shown.

What I claim is:

1. A steering gear construction comprising a cross tube having threaded ends, a tubular sleeve having threaded engagement with the thread of the cross tube and also having threaded engagement with a tubular fitting, said sleeve being split endwise and said fitting being also split endwise and provided with lugs, clamping bolts extending through said lugs, a disk mounted to move endwise of said fitting and bearing against the end of said sleeve, and a spring-positioned plunger inside of said fitting having at its end a bearing portion adapted to cooperate with a counterpart bearing member on an arm of the steering knuckle.

2. A steering gear construction comprising a cross tube having threaded ends, a tubular sleeve having threaded engagement with the thread of the cross tube and also having threaded engagement with a tubular fitting, said sleeve and said fitting being split endwise and provided with lugs, clamping bolts extending through said lugs, a disk mounted to move endwise of said fitting and bearing against the end of said sleeve, and a spring-positioned plunger inside of said fitting having at its end a bearing portion adapted to cooperate with a counterpart bearing member on an arm of the steering knuckle, and a seat for said bearing member of the steering knuckle arm in the end of said fitting opposite said plunger.

3. A steering gear construction comprising a cross tube having threaded ends, a tubular sleeve having threaded engagement with the thread of the cross tube and also having threaded engagement with a tubular fitting, said sleeve being split endwise and said fitting being also split endwise and provided with lugs, clamping bolts extending through said lugs, a disk mounted to move endwise of said fitting and bearing against the end of said sleeve, and a spring-positioned plunger inside of said fitting having at its end a bearing portion adapted to cooperate with a counterpart bearing member on an arm of the steering knuckle, and a seat for said bearing member of the steering knuckle arm in the end of said fitting opposite said plunger.

Signed at Detroit, Michigan, this 23rd day of February, 1924.

LAURENCE RAY BUCKENDALE.